United States Patent [19]

Costa

[11] 4,301,694

[45] Nov. 24, 1981

[54] HAND-OPERATED LEVER LINKAGE CONTROL

[76] Inventor: Larry J. Costa, Danville, Ill.

[21] Appl. No.: 961,496

[22] Filed: Nov. 17, 1978

[51] Int. Cl.³ .............................................. G05G 1/04
[52] U.S. Cl. .................................... 74/518; 74/501 R
[58] Field of Search ............ 74/518, 489, 516, 501 R, 74/491, 523, 525

[56] References Cited

U.S. PATENT DOCUMENTS

| | | | |
|---|---|---|---|
| 2,706,020 | 4/1955 | Freere et al. | 74/516 X |
| 2,884,803 | 5/1959 | Willis | 74/518 X |
| 3,693,474 | 9/1972 | Trick | 74/518 X |

*Primary Examiner*—Kenneth Downey
*Attorney, Agent, or Firm*—Woodard, Weikart, Emhardt & Naughton

[57] ABSTRACT

A hand-operated lever linkage control suitable for use as a motorcycle clutch control, comprising a housing attached to a vehicle, a lever assembly pivotally mounted in the housing and connected to a control linkage and a spring-tensioned pivoting eccentric arrangement in the housing and connected to the lever assembly for mechanically assisting lever travel during actuation of the control linkage. This spring-tensioned pivoting eccentric arrangement includes a pair of fulcrum pivots rotatably mounted in opposing sides of the housing forward of the lever assembly, a rigid member eccentrically mounted between the fulcrum pivots and rotatable therewith, rigid linkage arms connecting this rigid member to the lever assembly and a coil spring tensioned between the housing and the rigid member for urging pivotal movement of this eccentric assembly and for providing a mechanical advantage through the linkage arms to assist lever travel during actuation of the control linkage.

9 Claims, 5 Drawing Figures

HAND-OPERATED LEVER LINKAGE CONTROL

BACKGROUND OF THE INVENTION

This invention relates to the field of hand-operated lever controls and, particularly, to an improved control design employing a spring-tensioned pivoting eccentric assembly linked to the pivoting lever to provide a mechanical advantage during actuation of the control function.

Hand-operated lever assemblies for actuation of various control functions are well known in the art. These assemblies are common to a great number of motorized and other apparata, such as multiple-speed bicycles, motorized snow sleds, various gas-powered tools, bulldozers and other earth-moving equipment and all varieties of motorcycles.

Common to all such lever controls is the presence of a housing or other means of attaching the control to the particular vehicle and a lever arm pivotally mounted to this housing. Common also is the principle of connecting a cable, mechanical or hydraulic linkage control for a brake, clutch or other function to this pivoting lever with the lever travel then corresponding to the engagement or disengagement of the particular control function. For the remaining purposes of this specification, reference will be specifically made only to a cable-operated control in connection with the present invention. It is understood, however, that the invention has equal application to and provides equal advantage with lever controls employing mechanical, hydraulic or other linkage operably connected to a particular control function.

The lever travel necessary to operate the control function requires in all cases a certain amount of force to actuate the control cable or other linkage. Understandably, the magnitude of force required to engage or disengage this control function varies greatly, depending upon many factors including the particular lever design and the equipment in use. But regardless, some force is required in all such cases; and the physical energy required to provide this force and to operate the particular control can be appreciable as, for example, in the case of the repeated operation of a clutch lever control on a motorcycle, bulldozer or other heavy equipment.

Certain devices are also known in the art for achieving a mechanical advantage to assist in the performance of a specific task. For example, eccentric arrangements involving rods, discs and other members not coaxial in design are commonly used in a variety of circumstances, such as the cam shaft in a motor vehicle and the stringing assembly in a compound bow. Springs are also commonly used devices in this regard, as in the spring-loaded power transmission system disclosed in Richmond, U.S. Pat. No. 3,599,508.

Attempts have also been made to incorporate such devices for achieving a mechanical advantage into the designs for hand-operated lever controls. For example, Sorenson et al., U.S. Pat. No. 3,903,679, discloses spring means 42 and 42' mounted on the frame of a lawn mower for urging a specific bracket 36 and 36' into the clutch-disengaging position to assist in operating the lawn mower. Camp, U.S. Pat. No. 3,845,847, on the other hand, discloses in FIG. 3 the use of a spring 34' to provide an urging force to pull the cable 26 and urge the lever 24 away from the grip to thereby engage the brake and cut-off switch.

Regardless of these prior art attempts, however, the need exists for a compact and practical hand-operated lever control that is adaptable to a great variety of uses and that includes some means for simply and efficiently providing a mechanical advantage to assist in lever travel and in actuation of the control linkage.

SUMMARY OF THE INVENTION

In one aspect of the present invention, an improved hand-operated lever linkage control is provided in which a spring-tensioned pivoting eccentric means is mounted in the housing and connected to the pivoting lever assembly for mechanically assisting lever travel during actuation of the particular control linkage.

In addition, the preferred embodiment, as depicted and described hereinbelow, includes means for adjusting the assembly to vary the advantage achieved by this spring-tensioned eccentric means, with the resulting mechanical leverage or advantage on the lever assembly increasing with corresponding increases in lever travel. In this way, the pull or force required to operate the lever assembly and engage or disengage the control function is thus reduced as the draw length increases.

Related objects and advantages of the present invention will be apparent from the following description.

DESCRIPTION OF THE PREFERRED EMBODIMENT

Figure 1:
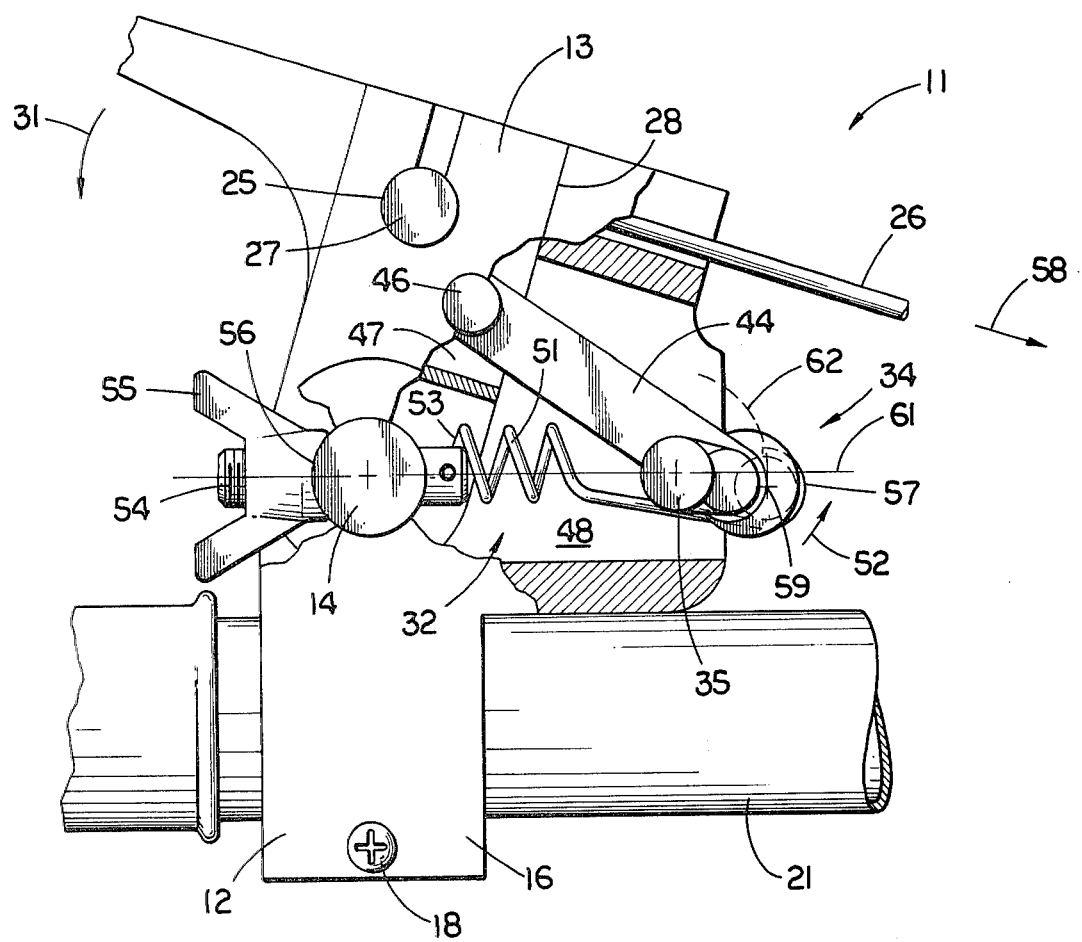
FIG. 1 is a partial side elevation of the hand-operated lever cable control of the preferred embodiment in the rest position and mounted to a motorcycle handlebar, with portions broken away to reveal the preferred arrangement of the spring-tensioned pivoting eccentric means of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, therein is depicted a hand-operated lever cable control 11 comprising the preferred embodiment of the present invention. Control 11 consists of a housing 12 and a lever assembly 13 pivotally mounted in the assembly at pivot pin 14.

Also provided are means for attaching the housing to a vehicle and means for connecting a control cable linkage to the lever assembly. As previously mentioned, reference will only be made herein to the use of a cable linkage in connection with the various embodiments of the present invention. It is nevertheless understood that mechanical, hydraulic or other control linkage can be readily substituted with equal effectiveness and advantage.

Figure 2:
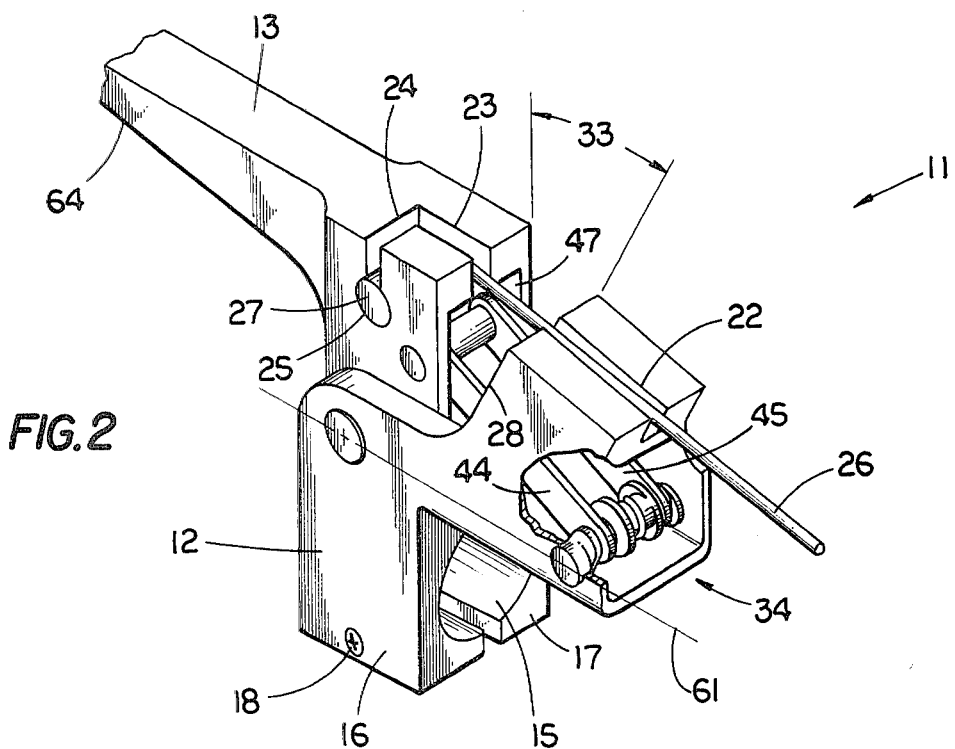
FIG. 2 is a perspective view of the motorcycle clutch control in FIG. 1 in the partially actuated, or clutch-disengaged, position, also with portions broken away to reveal the preferred spring-tensioned eccentric means arrangement.
Figure 3:
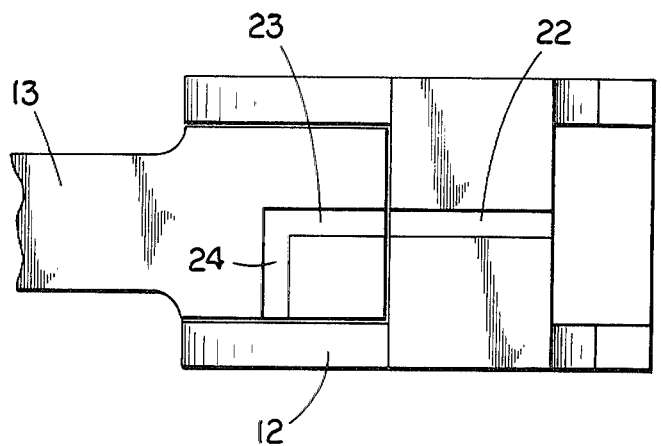
FIG. 3 is a top plan view of the control in FIG. 1 taken along line 3—3.

In preferred control 11, this means for attaching first includes a generally tubular channel 15 in the housing defined by two opposing walls 16 and 17, as better depicted in FIG. 2. The pinch bolt 18 extends through a journalled hole in the outer facing edges of these walls for securely tightening the channel and the housing 12 to a motorcycle handlebar 21.

The means for connecting in preferred control 11 first includes a machined slot or channel 22 in the upper portion of housing 12. This slot 22 abuts to a corresponding slot or channel 23 in lever assembly 13 which then terminates with a transverse slot 24 and machined anchor hole 25. A control cable 26, e.g., the clutch control cable for a motorcycle, is then stretched through the slots 22, 23 and 24 and secured with the desired tension by means of an appropriately sized cable anchor pin or screw 27, as depicted in FIG. 1.

This means for connecting the control cable to the lever assembly further includes means for actuating the control cable by pivotal movement of the lever assembly thereby disengaging or engaging the particular control function. In preferred control 11, this first position as depicted in FIG. 1 corresponds to the rest or clutch-engaged position for the clutch control of the motorcycle (not shown) with the lever assembly 13 directly abutting the housing 12 at surface 28. In FIG. 2, the pivotal lever travel in the direction of arrow 31 corresponds to the actuated or clutch-disengaged position for the motorcycle control thereby disengaging the motor output from the driven wheel.

Figure 4:
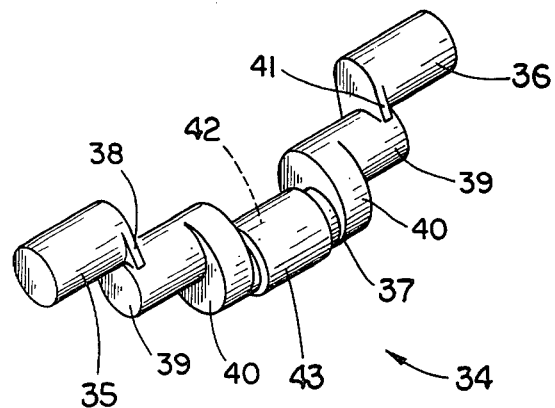
FIG. 4 is a perspective view of the eccentric assembly of the preferred embodiment as depicted in FIGS. 1 and 2.

To this point, the hand-operated lever control 11 described above is not unlike numerous other controls similarly designed for engaging and disengaging a control function by actuation of a control cable. However, control 11 of the preferred embodiment further includes spring-tensioned pivoting eccentric means 32 mounted in housing 12 and connected to lever assembly 13 for mechanically assisting lever travel during the actuation of control cable 26. This means 32 not only provides a mechanical advantage or leverage to the pivoting lever assembly 13, but also the advantage thereby achieved increases with increasing lever travel in the direction of arrow 31 thereby reducing the pull, or force, required to operate the lever assembly as the draw length 33 increases. To accomplish this increasing assistance, means 32 of the preferred embodiment is constructed as follows:

An eccentric assembly 34, as best depicted in FIG. 4, is first pivotally mounted in housing 12 forward of lever assembly 13. This assembly 34 includes two fulcrum pivots 35 and 36 rotatably mounted in opposing sides of the housing with a rigid offset member 37 eccentrically mounted between the pivots and rotatable therewith. In preferred control 11, this rigid member is screwably seated within saddle mounts 38 and 41 joined to pivots 35 and 36, respectively. A central portion 42 of rigid member 37 corresponds to a spring rest, or seat, and may include a bushing or sleeve 43 made of nylon or some other wear-resistant material to cushion a spring during lever travel. As further discussed hereinbelow, the outer end portions 39 and the central portion 42 of rigid member 37 may either be coaxial, or the central portion 42 may be offset by a particular amount, or degree, chosen to adapt the control 11 to a specific purpose or use.

Linkage means are next provided to connect this eccentric assembly 34 to the lever assembly 13 in order to achieve the desired advantage during lever travel. In preferred control 11, a pair of rigid linkage arms 44 and 45 are pivotally attached at one end to rigid member 37. These linkage arms are then connected at their opposite ends to a pivot pin 46 rotatably mounted in a journalled compartment or space 47 in lever assembly 13. An open space 48 is also provided in housing 12 to accommodate positioning and operation of the spring-tensioned pivoting eccentric means 32 as described herein.

A coil spring 51 is then placed in tension between the housing and this eccentric assembly 34 for urging pivotal movement of the eccentric assembly in the direction of arrow 52 and for thereby providing the mechanical advantage to assist lever travel during actuation of the clutch control 26. Specifically, in preferred control 11, the first end 53 of the spring is attached to the forward end of a bolt 54 slidable within a transverse hole drilled through pivot pin 14 for the lever assembly. An adjustable nut 55 is then threadedly received on the end of the bolt opposite the spring, this nut having a forward surface 56 conforming to the outer surface of pin 14 to provide a firm seat thereagainst, as further discussed hereinbelow.

The second, or forward, end 57 of spring 51 then attaches around the bushing 43 on central portion 42 of rigid member 37 and is disposed between the linkage arms 44 and 45.

The operation of control 11 of the preferred embodiment and its success in achieving an increasing mechanical advantage with increasing lever travel can be explained as follows:

In the rest or clutch-engaged position as depicted in FIG. 1, the force exerted by cable 26 in the direction of arrow 58 is sufficient to hold the lever assembly against surface 28 of the housing. In this position, the length of linkage arms 44 and 45 and the arrangement of means 32 must be such as to dispose rigid member 37 generally forward of fulcrum pivots 35 and 36. In fact, in preferred control 11 the arrangement is such that upon drawing a line 61 joining the axes of pin 14 and pivot 35, the axis 59 of the central spring seat 42 of rigid member 37 is disposed only slightly below the line thereby formed. With the coil spring 51 then placed in tension by a certain number of incremental one-half turns of wing nut 55, control 11 is now properly set and ready for operation.

In order to disengage the clutch control, lever assembly 13 must travel through a certain distance or angle in the direction of arrow 31. The specific distance or angle required for this clutch disengagement depends upon the amount of slack in cable 26 equal to the "free travel" built into the particular clutch control design 11. In preferred control 11, the clutch is first disengaged at a draw length, i.e., lever travel, indicated by numeral 33 in FIG. 2, with further pivotal travel of the lever assembly merely assuring total disengagement of the clutch assembly (not shown).

With this lever travel, eccentric assembly 34 pivots in the direction of arrow 52 around fulcrum pivots 35 and 36 with the axis 59 of the central portion of rigid member 37 first crossing line 61 and then traveling in a counterclockwise path along dotted line 62, as also depicted in FIG. 1. As soon as line 61 is crossed, spring 51 begins to urge the continued counterclockwise pivoting of member 37 about pivots 35 and 36. The amount of force supplied by spring 51 to urge this continued pivoting can be determined mathematically as a relationship between the spring constant and the changing angular relationship between the axis of pivot 14 and the axes of pivot 35 and rigid member 37. Generally, it is known that the pivoting force exerted by spring 51 on member 37 continues to increase in magnitude as member 37 pivots until a point is reached at which the angular relationship between the axes of pivots 14 and 46 and axis 59 of central portion 42 is such that the force applied to rigid member 37 decreases with continued incremental rotation of assembly 34.

Meanwhile, this force exerted by spring 51 to urge continued rotation of member 37 is transferred by linkage arms 44 and 45 to lever assembly 13. This spring-tensioned eccentric force is then translated at pivot pin 46 into a mechanical advantage or leverage which assists with lever travel in the direction of arrow 31. The end result of this advantage is that the force required to be exerted on the lever assembly at point 64 is appreciably reduced by the spring-tensioned eccentric force applied at pin 46. Furthermore, this advantage increases with increasing lever travel thereby reducing the pull required on the lever to disengage the clutch function with increasing draw length 33.

Control 11 thus provides a substantial improvement over all known prior art lever controls. It is compact, efficient and achieves an appreciable mechanical advantage to assist lever travel during actuation of a given cable control. It further provides increasing advantage with increasing lever travel and includes several additional means for simply and readily adapting the arrangement to vary the amount of advantage applied to lever assembly 13 at pivot pin 46. For example, one means for varying the resulting mechanical advantage is by simple adjustment of the tension on coil spring 51. This is readily accomplished by incremental one-half turns or revolutions of wing nut 55 on the threaded end of bolt 54.

The achieved advantage may also be varied, as alluded to hereinabove, by changing the degree or amount of offset of central portion 42 with respect to the outer end portions 39 of rigid member 37. For example, it is possible to use a rigid rod having a single longitudinal axis mounted in saddle mounts 38 and 41 to achieve a mechanical advantage in accordance with the present invention. In the preferred embodiment, however, rigid member 37 has a "cam-like" appearance with outer end portions 39 connected to offset central portion 42 by the enlarged intermediate portions 40. In this regard, preferred member 37 represents a 0° offset in that axis 59 of central portion 42 is colinear with a line 67 formed by intersecting the axes 49 and 60 of end portions 39 and intermediate portions 40, respectively.

Figure 5:
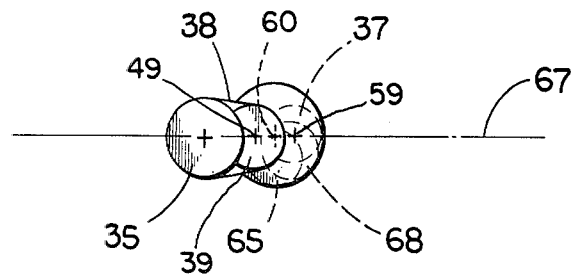
FIG. 5 is an end view of the eccentric assembly in FIG. 4 including three possible alternate degrees of offset for the spring rest control portion of the rigid member of the preferred embodiment.

FIG. 5 depicts two other possible degrees or amounts of offset for central portion 42. Dotted pattern 65 indicates an alternate arrangement in which central portion 42 is offset 90° down from the line 67 formed by axes 49 and 60 pivoted around axis 60 of intermediate portion 40. This arrangement establishes an amount of free travel for the control corresponding to the distance the axis of offset portion 42 must travel before intersecting line 61 in FIG. 1 and beginning to provide an advantage to the lever travel. Dotted pattern 68 depicts a similar arrangement with only a 45° offset resulting in less free travel and thus a smaller distance the lever assembly must be moved with no assistance from the spring-tensioned eccentric means 32.

Other degrees, or amounts, of offset for portion 42 can be incorporated into control 11 of the preferred embodiment and are clearly within both the scope and contemplation of this specification and the claims attached hereto. The selection of a particular offset degree or amount is conditioned on many factors, not the least of which is design and personal preference, and the specific ultimate use for the control.

Adjustments in still other elements such as the length of linkage arms 44 and 45 or the precise orientation of pivot pin 14 and pivots 35 and 36 are likewise clearly within the scope and contemplation of the present invention, as are all variations in material choice and other features that would be obvious to a person of ordinary skill in the art to which this invention pertains.

In further explanation and description of the present invention, a motorcycle clutch control simulator was constructed as described above according to preferred control 11, employing a 45 degree offset for central portion 42 of member 37. With the clutch control cable properly connected, but without the aid of spring-tensioned pivoting eccentric means 32, the control was tested and determined to require 115 lbs. of force to fully actuate the cable and disengage the clutch control. With means 32 then connected and with 50 lbs. of tension on spring 51, the control was again tested and determined to require only about 25 lbs. of additional pull for full actuation. A similar test for 50% of full lever travel revealed an unaided requirement of 55 lbs. of force and an aided requirement of only about 15 lbs. of force.

The improved control of the present invention therefore provided a mechanical advantage of about 40 lbs. at 50% lever travel and about 80 lbs. at full lever and cable actuation. This demonstrates a substantial improvement over all known prior art lever controls.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A hand-operated lever linkage control, comprising:
   (a) a housing including means for attaching said housing to a vehicle;
   (b) a lever assembly pivotally mounted in said housing and including means for connecting a control linkage thereto, said means for connecting including means for actuating the control linkage by pivotal movement of said lever assembly between a rest and an actuated position; and
   (c) spring-tensioned pivoting eccentric means in said housing and connected to said lever assembly for mechanically assisting lever travel during actuation of the control linkage, said spring-tensioned pivoting eccentric means including:
      (1) an eccentric assembly pivotally mounted in said housing, said eccentric assembly including:

(a) a pair of fulcrum pivots rotatably mounted in opposing sides of said housing forward of said lever assembly; and (b) a rigid member eccentrically mounted between said fulcrum pivots and rotatable therewith, said linkage means being a pair of rigid linkage arms pivotally attached between said rigid member and said lever assembly;

(2) a linkage member connecting said eccentric assembly and said lever assembly; and (3) a coil spring tensioned between said housing and said eccentric assembly for urging pivotal movement of said eccentric assembly and for providing a mechanical advantage through said linkage member to assist lever travel during actuation of the control linkage.

2. The control in claim 1 in which said coil spring includes a first end pivotally attached to the pivot for said lever assembly and a second end attached to said rigid member.

3. The combination comprising:
(a) a motorcycle including a handlebar and a clutch control linkage; and
(b) the hand-operated lever linkage control in claim 2 attached to said handlebar, said clutch control linkage being connected to said pivotally mounted lever assembly.

4. The control in claim 2 in which said means for assisting lever travel includes said coil spring urging continued pivotal movement of said eccentric assembly and applying a force through said linkage arms to assist with continued lever travel during actuation of the control linkage.

5. The control in claim 2 additionally comprising means for varying the mechanical advantage achieved by said spring-tensioned pivoting eccentric means through said linkage arms to assist lever travel during actuation of the control linkage.

6. The control in claim 5 in which said rigid member includes an offset central portion therein having a wear-resistant bushing for attachment of the second end of said coil spring.

7. The control in claim 6 in which said means for varying includes means for varying the degree of offset in said central portion of said rigid member, said rigid member being screwably and interchangeably attached within saddle mounts on said fulcrum pivots.

8. The control in claim 6 in which said means for varying includes means for adjusting the tension on said coil spring.

9. The control in claim 7 in which said means for adjusting includes:
(a) a bolt slidable within a transverse hole through the pivot for said lever assembly, said first end of said spring being attached to the forward end of said bolt; and
(b) an adjustable nut threadedly received on the end of said bolt opposite said spring, said nut having a forward surface conforming to the outer surface of the pivot for said lever assembly and being adjustable in incremental one-half turns.

* * * * *

UNITED STATES PATENT AND TRADEMARK OFFICE
CERTIFICATE OF CORRECTION

PATENT NO. : 4,301,694
DATED : November 24, 1981
INVENTOR(S) : Larry J. Costa

It is certified that error appears in the above-identified patent and that said Letters Patent are hereby corrected as shown below:

In column 7, line 6, please delete the following words:

"said linkage means being a pair of rigid linkage arms pivotally attached between said rigid member and said lever assembly".

In column 7, line 31, replace the word "arms" with --member--.

In column 8, line 6, replace the word "arms" with --member--.

Add claim 10:

10. The control in claim 6 in which said linkage member is a pair of rigid linkage arms pivotally attached between said rigid member and said lever assembly.

Signed and Sealed this

Twenty-fifth Day of January 1983

[SEAL]

*Attest:*

*Attesting Officer*

GERALD J. MOSSINGHOFF

*Commissioner of Patents and Trademarks*